United States Patent [19]

de Jong

[11] Patent Number: 5,104,468

[45] Date of Patent: * Apr. 14, 1992

[54] METHOD OF PRODUCING A MOLDED CONNECTION PIECE AND METHOD FOR JOINING TUBE WITH MOLDED CONNECTION PIECE

[75] Inventor: Arie de Jong, Breda, Netherlands

[73] Assignee: Riesselmann & Sohn, Lohne, Fed. Rep. of Germany

[ * ] Notice: The portion of the term of this patent subsequent to Jun. 12, 2007 has been disclaimed.

[21] Appl. No.: 522,537

[22] Filed: May 11, 1990

Related U.S. Application Data

[60] Continuation of Ser. No. 257,815, Oct. 13, 1988, Pat. No. 4,933,037, which is a division of Ser. No. 141,101, Jan. 5, 1988, abandoned, which is a continuation-in-part of Ser. No. 862,008, May 12, 1986, abandoned.

[51] Int. Cl.$^5$ ............................................. B29C 65/34
[52] U.S. Cl. ...................................... 156/166; 156/257; 156/274.2; 219/535; 219/544; 264/27; 264/272.11; 285/21; 285/156
[58] Field of Search ................. 156/257, 274.2, 379.7, 156/166; 219/535, 544, 541; 285/21, 155, 156; 264/27, 272.11

[56] References Cited

U.S. PATENT DOCUMENTS

| | | | |
|---|---|---|---|
| 4,455,482 | 6/1984 | Grandclement | 219/551 |
| 4,684,428 | 8/1987 | Ewen et al. | 156/257 |
| 4,770,442 | 9/1988 | Sichler | 285/21 |
| 4,851,647 | 7/1989 | Kühling | 219/535 |

FOREIGN PATENT DOCUMENTS 336980  4/1959  Switzerland ............ 156/274.2

*Primary Examiner*—Michael Wityshyn
*Attorney, Agent, or Firm*—Collard, Roe & Galgano

[57] ABSTRACT

There is provided a molded connection piece and a method of making the same, in particular a boring saddle made of thermoplastic material and having a heating wire capable of conducting an electric current for producing a welded joint between the molded connection piece and an object to be joined with the molded connection piece. The heating wire is embedded in both surfaces of a disk-shaped core, in each case following the course of a spiral-shaped groove, and the core having the heating wire is joined with the molded connection piece. The disk-shaped core is formed of a material which, on melting, combines itself with the material of the molded connection piece.

8 Claims, 3 Drawing Sheets

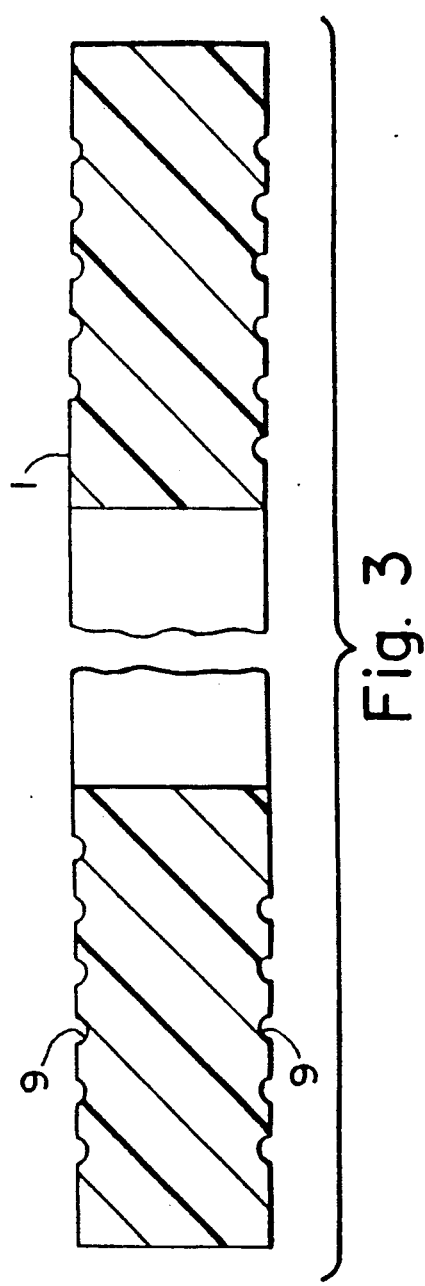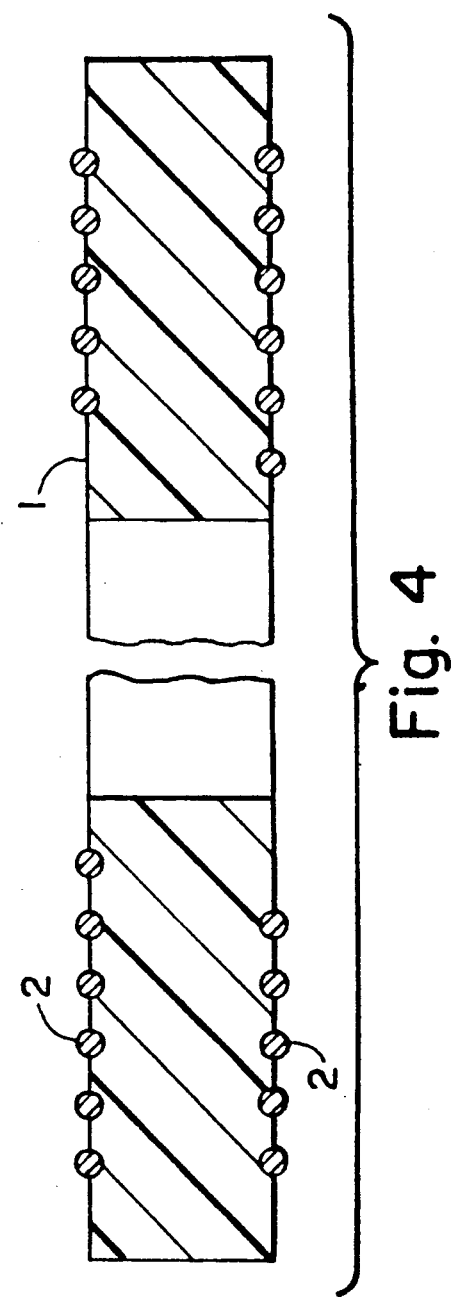
Fig. 3
Fig. 4

METHOD OF PRODUCING A MOLDED CONNECTION PIECE AND METHOD FOR JOINING TUBE WITH MOLDED CONNECTION PIECE

This is a Continuation of my earlier filed application Ser. No. 257,815, filed Oct. 13, 1988, entitled "METHOD OF PRODUCING A MOLDED CONNECTION PIECE IN PARTICULAR A BORING SADDLE (As Amended), now U.S. Pat. No. 4,933,037, which is a Divisional application of my earlier filed application Ser. No. 141,101 (abandoned), filed Jan. 5, 1988, entitled "A MOLDED CONNECTION PIECE, IN PARTICULAR A BORING SADDLE, AND METHOD OF PRODUCING THE SAME", which is a Continuation-In-Part application of my earlier filed co-pending application Ser. No. 862,008, filed May 12, 1986, entitled A MOLDED CONNECTION PIECE, IN PARTICULAR A BORING SADDLE, AND METHOD OF PRODUCING THE SAME now abandoned.

The present invention relates to a method of producing a molded connection piece, in particular a boring saddle formed of thermoplastic material. More particularly, the present invention relates to such a molded connection piece having a heating wire capable of conducting an electric current for producing a welded joint between the molded connection piece and an object to be joined with the molded connection piece.

A boring saddle as described above may be utilized in situations where a "T" connection is to be made in an already existing plastic pipe. Thus, the saddle is provided with a shape corresponding to a segment of the existing plastic pipe and having a short pipe section extending at right angles therefrom. The saddle is placed against the existing pipe and welded thereto and an opening is drilled through the wall of the existing pipe drilling through the short pipe section. In this manner a "T" connection is formed in a pipe which had been previously placed.

Such a method as described above is disclosed in European Patent Application No. 82 401 203.3.

For the purpose of joining a tube made of thermoplastic material with a molded connection piece by means of welding, a molded connection piece provided with an electric heating element in the form of a metallic heating wire wound in the form of a spiral is frequently used. The heating wire is secured on or within the surface of the molded connection piece. For a preset period of time, electric current is passed through the spiral-shaped heating wire for producing a welded joint between the molded connection piece and an object to be joined with the molded connection piece, such as the tube described above. The generation of heat in the heating wire causes the material of the molded connection piece and the material of the object to be joined therewith to melt at the contact surfaces of the two parts. According to the above-cited European Patent Application No. 82 401 203.3, the spiral-shaped heating wire is secured by embedding it in the surface of a disk. The inside end of the heating wire is bent over and extended across the shaped spiral, separated from the surface of the disk by a reversible lip, in order to extend this end of the heating wire to the outside of the spiral so that both ends of the heating wire may be readily connected to a voltage source This method has the drawback, however, that the surfaces facing each other at the point where the bent inside end of the heating wire and the spiral cross each other are heated in an uneven way, which non-uniform heating highly impairs the quality of the welded joint.

It is the object of the present invention to enhance the method as described above so as to improve the quality of the welded joint and to provide a novel connection piece having embedded electrical heating elements for the attainment of this result.

The above object, as well as others which will hereinafter become apparent, is accomplished according to the present invention by embedding the heating wire in both surfaces of a disk-shaped core, following the course of a spiral-shaped groove in each case, and by this core being joined with the molded connection piece The disk-shaped core consists of a material which, on melting, combines itself with the material of the molded connection piece. Preferably according to the invention, one heating wire is advantageously embedded in each of the two heating surfaces of the disk-shaped core in the shape of a spiral and the two heating wires are connected to each other on the innerside in the center of the spiral. Also, it is possible to embed a two-lead wire in the shape of a spiral or to embed a through-extending heating wire first in one surface of the core and subsequently in the other surface of the core.

Furthermore, the heating wire may be embedded in one surface of each of the two disks and the disks joined to form the disk-like core with their surfaces opposing the heating wire resting against each other.

By selecting the shape and type of embedding of the heating wire, the molded connection piece may be adapted to the specific heating requirements for producing an optimum welded joint. By way of example, the heating wire may be embedded as a blank or insulated heating wire; if the heating wire is wound in the form of a spiral, the spacing between the windings or the number of windings may vary from one surface of the disk-like core to the other; or the diameters of the heating wires in the two surfaces of the disk-like core may be varied; and the spirals consisting of heating wire may be wound selectively, for example anticlockwise or clockwise.

However, in all possible embodiments of the molded connection piece according to the present invention, each of the two surfaces of the disk-like core is advantageously provided with one heating wire, which permits a more uniform and complete melting of the disk-shaped core and of the surfaces of the molded connection piece adjoining the core, and of the surface of the object to be joined with the molded connection piece, for producing a permanent, high-quality welded joint.

The size of the shaped spiral with the embedded heating wire depends on the size of the surface of the molded connection piece to be provided with the welded joint and the size of the surface of the object to be joined with the molded connection piece. Consequently, for producing a proper welded joint, ratings vary depending on the size of the spiral. According to European Patent Application No. 82 304 616.4, an electric welding device for joining thermoplastic tubes is provided with a heating wire and an auxiliary resistor which is connected in series with the heating wire. For determining the total resistance value of the heating wire and auxiliary resistor, an electric controlling and metering device is connected to the electric welding equipment in order to pass an electric current through the heating wire for a period of time conforming to the measured total resistance value. The period of time is set automatically, whereby it is assumed that a defined total resistance value presupposes a defined period of time, or duration of current feed. This method of resistance measurement, however, is not very accurate for a universal system with automatic time setting as far as the measured resistance value is concerned. This is because different types of electric welding equipment from different manufacturers show highly varying resistance values for the heating wire for the same area of molded connection pieces, so that the tolerance of specific resistances of the heating wires may vary significantly, resulting in different resistance values.

In order to remedy the above situation, an auxiliary resistor is provided with the molded connection piece of the invention for the purpose of achieving an automatic welding operation. The auxiliary resistor is connected to the electric controlling and metering device by way of separate conductors in the same manner as the heating wire. In this way, the resistance value of the auxiliary resistor may be accurately determined independently of the resistance in the heating wire. The resistance value so determined may be used with any system for manufacturing a molded connection piece according to the invention provided that a defined resistance value of the auxiliary resistor, which, by way of example, amounts to 100 ohms or less up to 10,000 ohms or more, conforms to a predetermined welding time in seconds, for example 10 seconds or less up to 600 seconds or more. The auxiliary resistor may be mounted while the molded connection piece is being molded or after it has been molded.

In a preferred embodiment of the invention, the auxiliary resistor is provided with a protective covering and fastened on the molded connection piece by means of connection pins. Depending on the tolerances of the specific resistance and diameter of the wire from which the heating wire is made, the welding time required to supply the desired output may be calculated after the resistance value of the heating wire of the molded connection piece has been determined, and the correct auxiliary resistor with the appropriate resistance value is fitted on the molded connection piece accordingly. During the welding step, the correct auxiliary resistor assures that the required energy is supplied during the predetermined period of time with the help of the electric controlling and metering device. In this way, the amount of rejects of produced welds may be advantageously reduced to a minimum.

In order to permit a visual evaluation or inspection the welding quality during the course of welding of molded connection pieces, preferably a socket is advantageously provided in the molded connection piece at any suitable point, whereby the wall or bottom of the socket is partially in contact with the heating wire and a matching, marked pin, of a material other than that used for the molded connection piece, is inserted in the socket. This marked pin advantageously serves for visually controlling the quality of the welded joint during the course of the welding process because the thermal expansion of the melting material produces an excess pressure and the melting material, due to this excess pressure, is forced into the socket, lifting the loosely inserted pin upwardly. The extent of such upward lift can be read on the outwardly projecting marking on the pin and is a measure of the quality of the weld produced because the height of lift of the marked pin is dependent on the amount of material melted in the welding process. The amount of material melted determines the area or size of the zone of fusion and thus the durability of the welded joint between the molded connection piece and the object to be joined with said piece.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views FIG. 1a is a top view of a disk-shaped core with a spiral-shaped heating wire;

FIG. 1b is a cross-sectional view of the disk-shaped core of FIG. 1a;

FIG. 2b is a cross-sectional view of the boring saddle according to FIG. 2a;

FIG. 3 is a cross-sectional view of the disk-shaped core showing shallow grooves therein; and FIG. 4 is a view similar to FIG. 3 with heating wires shown in the disk.

Figure 1A:
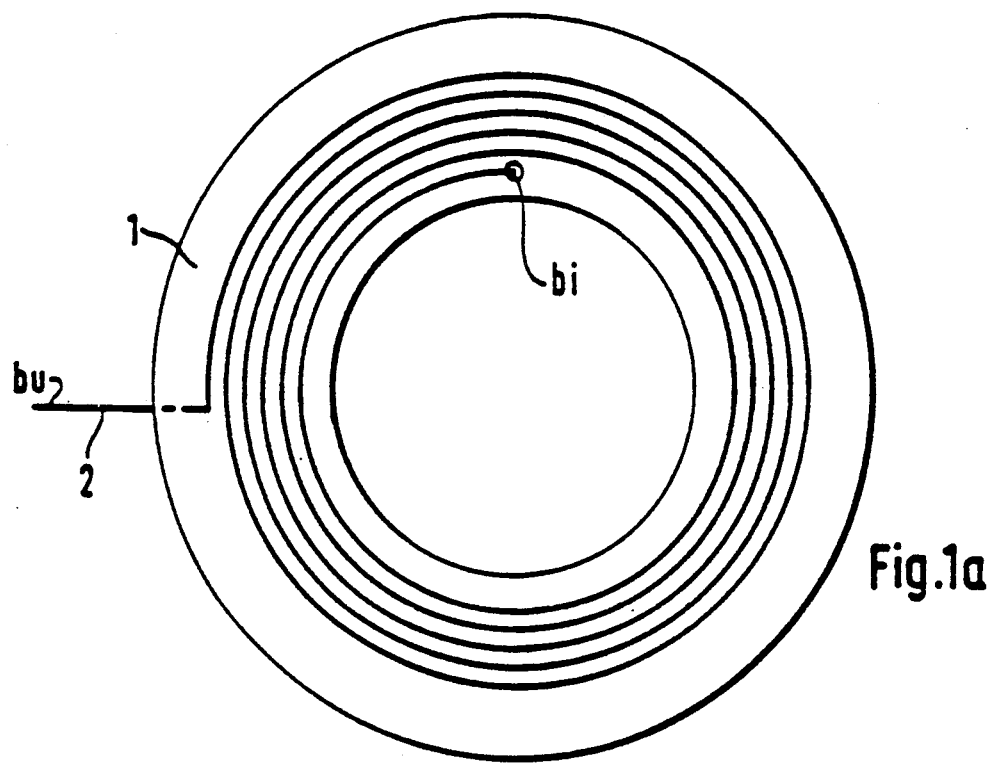
Figure 1B:
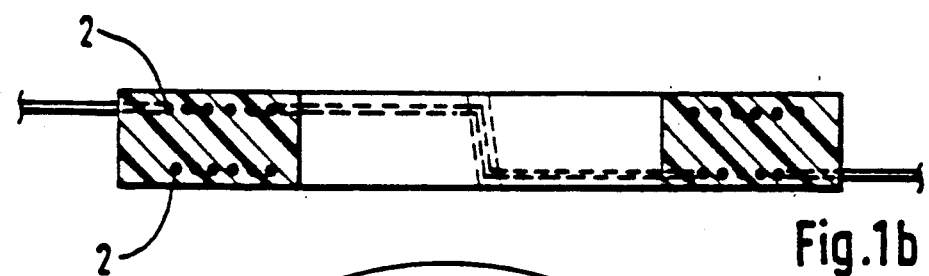
Figure 1C:
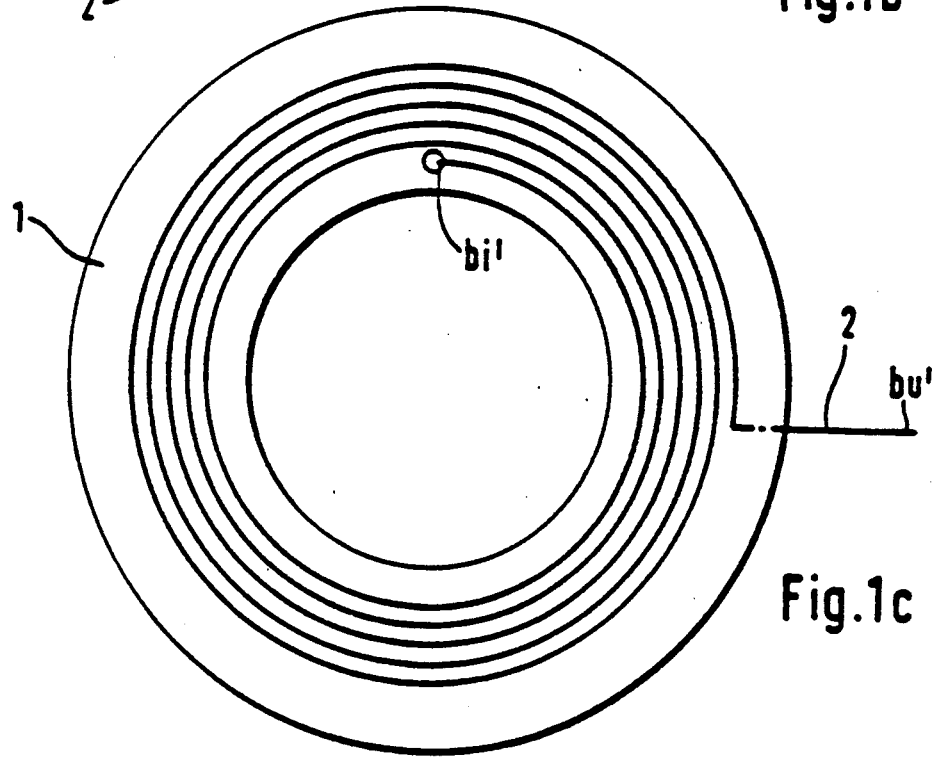
FIG. 1c is a bottom view of a disk-like core.

Now turning to the drawings, there is shown in FIG. 1 a disk-like core 1 having a spiral-shaped heating wire 2 embedded in its two surfaces. The inside ends bi and bi' of heating wire 2 are connected to each other in the center of spiral-shaped heating wire 2, so that when connected to an electric voltage source, current may flow from the outer end bu of the heating wire to the other outer end bu' of the heating wire. The pitch of the spiral-shaped winding of heating wire 2 is selected depending on the heating requirements. Thus, heating wire 2 may be provided with ten or less and up to thirty or more windings.

Figure 2A:
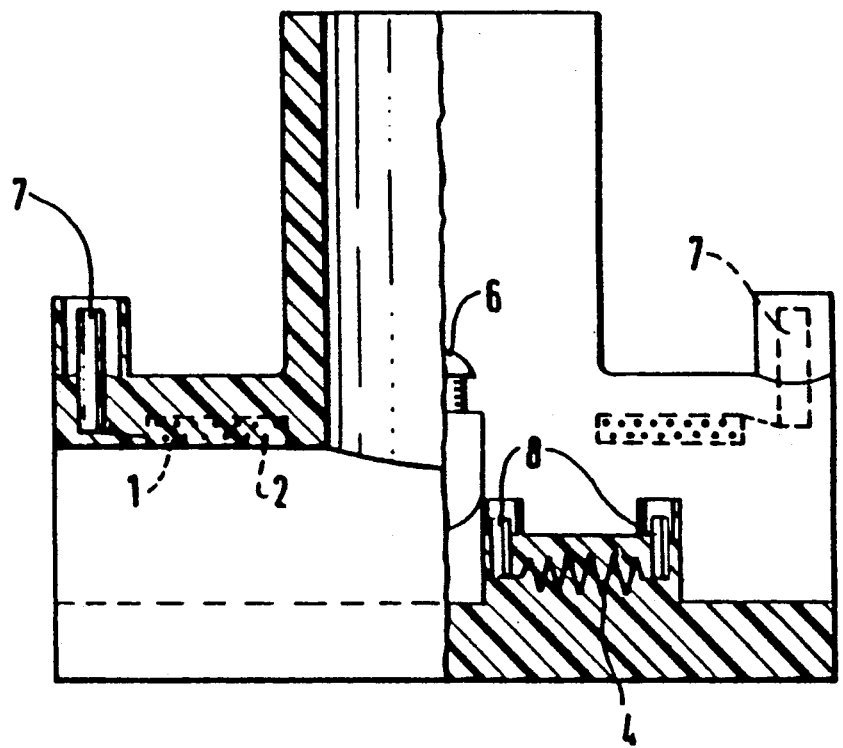
FIG. 2a is a longitudinal cross-sectional view of a boring saddle in which a disk-shaped core with a heating wire is fitted in a bent form, the core being provided with connection pins, an auxiliary resistor and a cylindrical socket having a pin loosely inserted therein.
Figure 2B:
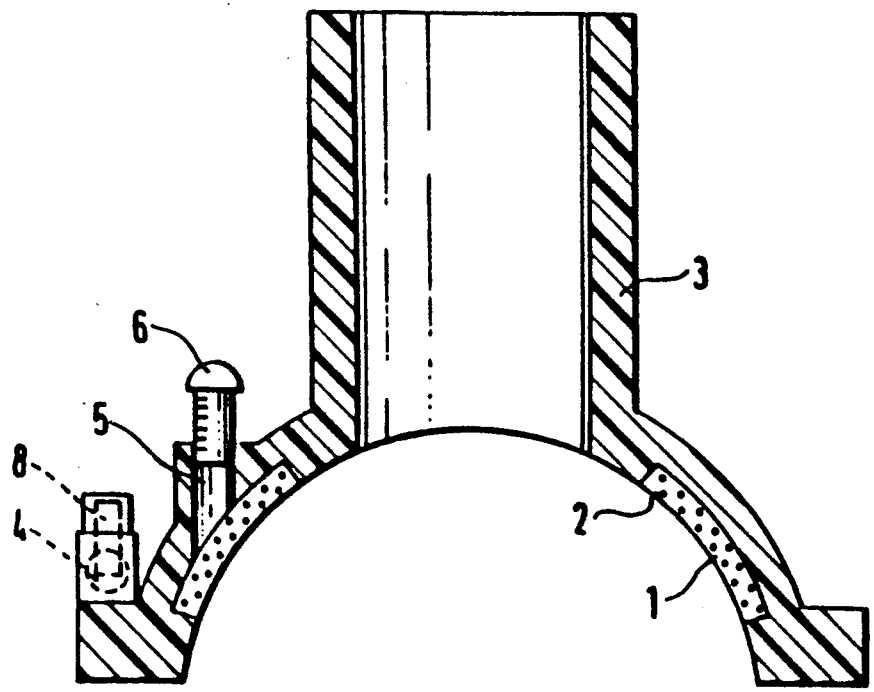

In FIGS. 2a and 2b there is shown a heating element consisting of a disk-like core 1 having a heating wire 2 and connection pins 7. As can be clearly seen, the heating element is bent to such an extent that the bending radius conforms to the radius of a molded connection piece 3 to be formed. The heating element is placed as an insert in the compression or casting mold. After the molded connection piece 3 has been produced, the heating element with the disk-like core consisting of a material which combines itself with the material of the molded connection piece 3, is formed as a unit together with molded connection piece 3. According to a further development of the present invention, a recess is kept clear in molded connection piece 3, as can be seen in FIGS. 2a and 2b, and the heating element is inserted or placed in this recess after the molded connection piece 3 has been produced.

Furthermore, in FIGS. 2a and 2b there is shown an auxiliary resistor 4 provided with connection pins 8. On removal of molded connection piece 3 from the mold, the connection pins are inserted at a suitable point in the molded connection piece 3, or they are arranged as a unit after the molded connection piece 3 has been manufactured. This unit consists of auxiliary resistor 4 with connection pins 8 enclosed in a protective covering and which is mounted on the molded connection piece.

Furthermore, FIGS. 2a and 2b show a recess or socket 5 which is formed during the molding of molded connection piece 3 with the help of a suitably shaped pin having a round, oval, square or any other cross section. After molded connection piece 3 has been removed from the mold, a suitably shaped, marked pin 6 is loosely inserted in recess 5. If need be, molded connection piece 3 may have a plurality of recesses or sockets 5 with matching marked pins 6.

It is preferred according to the present invention that the heating wire be disposed in shallow spiral grooves in the surfaces of the disk-like core. As clearly seen in FIGS. 3 and 4, shallow grooves, designated 9, are formed in the shape of a spiral in both the top and bottom surfaces of the disk-like core 1. Heating wire 2, as clearly seen in FIG. 4, is disposed in the spiral-shaped grooves 9 such that it is partially embedded in the respective surfaces of the disk-like core. With this construction, the manufacture of the disk-like core is simplified and the implanting thereof in the recess of connection piece 3 is made more efficient because of the surface positioning of heating wire 2 which, when heated, causes the firm adherence of core 1 to connection piece 3.

While only two embodiments of the present invention have been shown and described, it will be obvious that many changes and modifications may be made thereunto without departing from the spirit and scope of the invention.

What is claimed is:

1. A method of making a molded connection piece made of thermoplastic material and having a heating wire capable of conducting an electrical current for producing a welded joint between the molded connection piece and an object to be joined with said molded connection piece, said method comprising the steps of:
   providing a molded connection piece;
   providing at least one disk having opposite, generally parallel surfaces and a spiral-shaped groove in each of said surfaces thereof;
   embedding a heating wire in both surfaces of said at least one disk, following the course of said spiral-shaped grooves in each such surface thereof; and
   joining said at least one disk with said molded connection piece, said at least one disk consisting of material which, on melting, combines itself with the material of the molded connection piece.

2. The method according to claim 1, wherein said heating wire is in the form of a single, continuous length of wire, which is embedded in one surface of said at least one disk and then the other surface.

3. The method according to claim 1, additionally comprising the step of bending said at least one disk so that its bending radium conforms to the radius of said molded connection piece.

4. A method of making a molded connection piece made of thermoplastic material and having a heating wire capable of conducting an electrical current for producing a welded joint between the molded connection piece and an object to be joined with said molded connection piece, said method comprising the steps of:
   providing a molded connection piece;
   providing at least one disk having a spiral-shaped groove in each surface thereof;
   embedding a heating wire in both surfaces of said at least one disk, following the course of said spiral-shaped grooves in each such surface thereof;
   wherein said heating wire is only partially embedded in said groove, so that a portion of said wire projects outwardly of said groove; and
   joining said at least one disk with said molded connection piece, said at least one disk consisting of a material which, on melting, combines itself with the material of the molded connection piece.

5. In a method for joining a tube made of thermoplastic material with a molded connection piece by means of welding, the improvement comprising the following steps:
   providing a molded connection piece and a tube;
   providing at least one disk having opposite, generally parallel surfaces and a spiral-shaped groove in each of said surfaces thereof;
   embedding a heating wire in both surfaces of said at least one disk, following the course of said spiral-shaped grooves in each such surface thereof;
   joining said at least one disk with said molded connection piece, said at least one disk consisting of a material which, on melting, combines itself with material of said molded connection piece;
   placing said molded connection piece with said joined disk on to said tube to be joined; and
   passing an electric current through said heating wire to in turn cause melting of said disk and the joining of said connection piece, said disk and said tube to be joined in situ.

6. The method according to claim 5, wherein said heating wire is in the form of a single, continuous length of wire, which is embedded in one surface of said at least one disk and then the other surface.

7. The method according to claim 5, additionally comprising the step of bending said at least one disk so that its bending radius conforms to the radius of the molded connection piece.

8. In a method for joining a tube made of thermoplastic material with a molded connection piece by means of welding, the improvement comprising the following steps:
   providing a molded connection piece and a tube;
   providing at least one disk having a spiral-shaped groove in each surface thereof;
   embedding a heating wire in both surfaces of said at least one disk, following the course of said spiral-shaped grooves in each such surface thereof wherein said heating wire is only partially embedded in said groove, so that a portion of said wire projects outwardly of said groove;
   joining said at least one disk with said molded connection piece, said at least one disk consisting of a material which, on melting, combines itself with the material of said molded connection piece;
   placing said molded connection piece with said joined disk on to said tube to be joined; and
   passing an electric current through said heating wire to in turn cause melting of said disk and the joining of said connection piece, said disk and said tube to be joined in situ.

* * * * *